(12) United States Patent  
Tien

(10) Patent No.: US 7,438,483 B2
(45) Date of Patent: Oct. 21, 2008

(54) BUS SYSTEM WITH OPTICAL FIBERS AND ELECTRONIC DEVICE HAVING SAME

(75) Inventor: Yao-Wen Tien, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/627,550

(22) Filed: Jan. 26, 2007

(65) Prior Publication Data

US 2008/0080819 A1 Apr. 3, 2008

(30) Foreign Application Priority Data

Sep. 29, 2006 (CN) .................. 200610062909.5

(51) Int. Cl.
*G02B 6/36* (2006.01)

(52) U.S. Cl. ........................................... 385/89

(58) Field of Classification Search ............ None
See application file for complete search history.

(56) References Cited

U.S. PATENT DOCUMENTS 5,245,680 A * 9/1993 Sauter .................... 385/24
6,567,963 B1 * 5/2003 Trezza ...................... 716/8
6,583,904 B1 * 6/2003 Mahlab et al. ............ 398/129
2004/0013432 A1 * 1/2004 Karnik et al. ............. 398/88

* cited by examiner

*Primary Examiner*—Michelle R. Connelly-Cushwa
*Assistant Examiner*—Chris Chu
(74) *Attorney, Agent, or Firm*—Frank R. Niranjan

(57) ABSTRACT

An exemplary bus system (50) is used to transmit data between electrical components (61, 62, 63) in an electronic device. The bus system includes a plurality of optical fibers (51), a plurality of emitters (52) and a plurality of sensors (53). The optical fibers are used to connect the electrical components to one another. A respective one of the emitters and a respective one of the sensors are disposed at each end of each of the optical fibers. Each end of each of the optical fibers with the emitter and the sensor is configured to be connected to an electrical component. An electronic device employing the bus system is also provided.

2 Claims, 5 Drawing Sheets

BUS SYSTEM WITH OPTICAL FIBERS AND ELECTRONIC DEVICE HAVING SAME

BACKGROUND OF THE INVENTION

1. Field of the Invention

The present invention relates to bus systems, and particularly to a bus system used in an electronic device.

2. Discussion of the Related Art

In electronic devices such as computers, a variety of electrical components are generally connected to each other by a series of information channels known as a data bus, or simply a bus. Nowadays, buses are usually made of conductive metallic material such as copper.

Referring to FIG. 4, a typical bus system 20 includes a plurality of copper wires 21. In a typical computer, the bus system 20 is used to connect a plurality of electrical components that are attached to a motherboard 22. A first circuit 23 and a socket 24 are fixed on the motherboard 22. The first circuit 23 and the socket 24 are connected to each other by the copper wires 21. A second circuit 25 can for example be a chip. The second circuit 25 is connected to the socket 24 by inserting chip pins of the second circuit 25 into the socket 24, thus connecting the first circuit 23 and the second circuit 25 and allowing data to be transmitted between them. A plurality of insulating layers 26 are further provided between every two adjacent copper wires 21 for reducing electromagnetic interference (EMI) between the copper wires 21.

However, with the development of electronics technology and communications technology, there is ongoing demand to increase a bandwidth and a transmission rate of data communication. Thus, the number of copper wires 21 of the bus system 20 may need to be increased with each new version of the motherboard 22 released. However, the circuit layout of the motherboard 22 with more copper wires 21 is correspondingly more complex, and the size of the motherboard 22 itself may need to be expanded. In addition, even though the insulating layers 26 are provided, EMI may still occur between the copper wires 21. Furthermore, when electronic signals transmit through the copper wires 21, heat is generated therein. Thus, there is loss energy through heat dissipation.

Therefore, bus systems which solve the above-described problems are desired.

SUMMARY

A bus system is used to transmit data between electrical components in an electronic device. The bus system includes a plurality of optical fibers, a plurality of emitters and a plurality of sensors. A respective one of the emitters and a respective one of the sensors are disposed at each end of each of the optical fibers. Each end of each of the optical fibers with the emitter and the sensor is configured to be connected to an electrical component. An electronic device employing the bus system is also provided.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present bus system and associated electronic device. Moreover, in the drawings, like reference numerals designate corresponding parts throughout the several views, and all the views are schematic.

DETAILED DESCRIPTION OF THE EMBODIMENTS

The present invention provides a bus system applied in electronic devices such as computers. As an example, the bus system as applied for connecting electrical components in a computer is described and illustrated herein.

Figure 1:
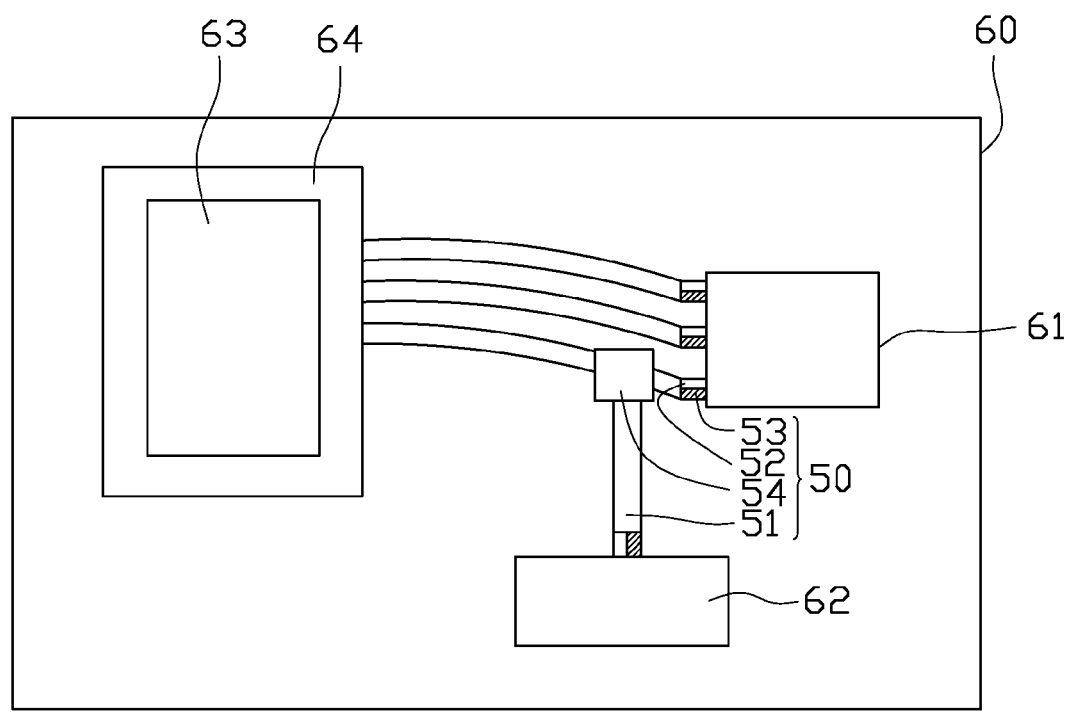
FIG. 1 is a top plan view of a bus system in accordance with an exemplary embodiment of the present invention, showing the bus system interconnecting various electrical components on a motherboard, the bus system including a plurality of optical fibers, the electrical components including a circuit and a corresponding socket.

Referring to FIG. 1, a bus system 50 utilized in a computer (not shown) includes a plurality of optical fibers 51. An emitter 52 and an optical sensor 53 are provided at each end of each of the optical fibers 51. The computer includes a motherboard 60, a first circuit 61 such as a display chip, a second circuit 62 such as a memory chip, and a third circuit 63 such as a digital to analog circuit (DAC). The first circuit 61, the second circuit 62, and the third circuit 63 are coupled to the bus system 50, and are thus communicatively connected to each other.

Each of the circuits 61, 62, 63 may be directly coupled to the motherboard 60, or may be coupled to the motherboard 60 via a socket. In this embodiment, the first circuit 61 and the second circuit 62 are directly coupled to the motherboard 60. Some of the optical fibers 51 with the emitters 52 and the sensors 53 connect the first circuit 61 and the second circuit 62. The third circuit 63 is attached to the motherboard 60 via a socket 64 that is directly coupled to the motherboard 60.

Figure 2:
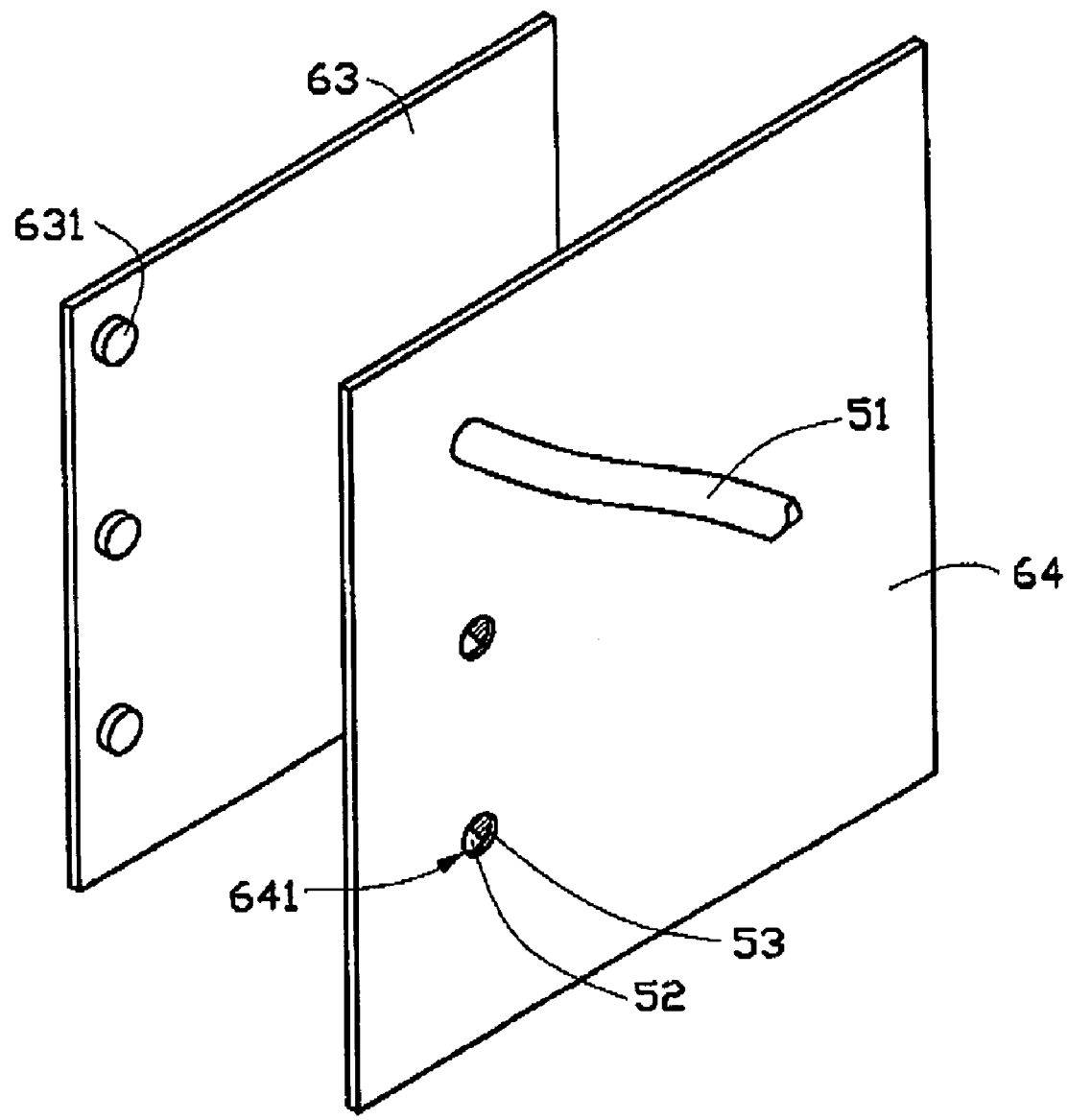
FIG. 2 is an enlarged, exploded, isometric view of the circuit, the socket, and part of one of the optical fibers of FIG. 1, also showing an optical sensor and an emitter in a through hole of the socket, and another optical sensor and another emitter in another through hole of the socket.
Figure 3:
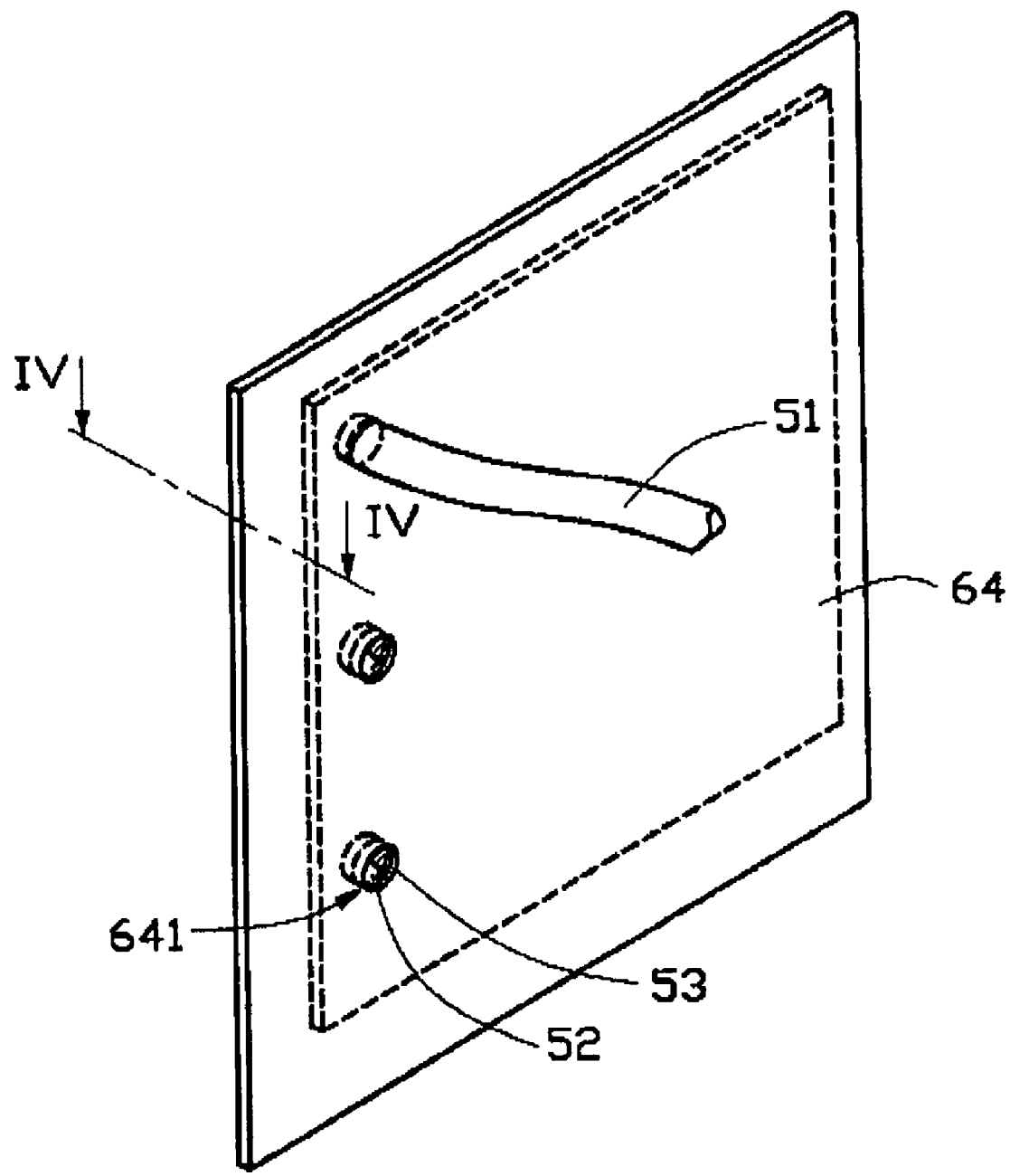
FIG. 3 is an assembled view of FIG. 2, showing the circuit in phantom.
Figure 4:
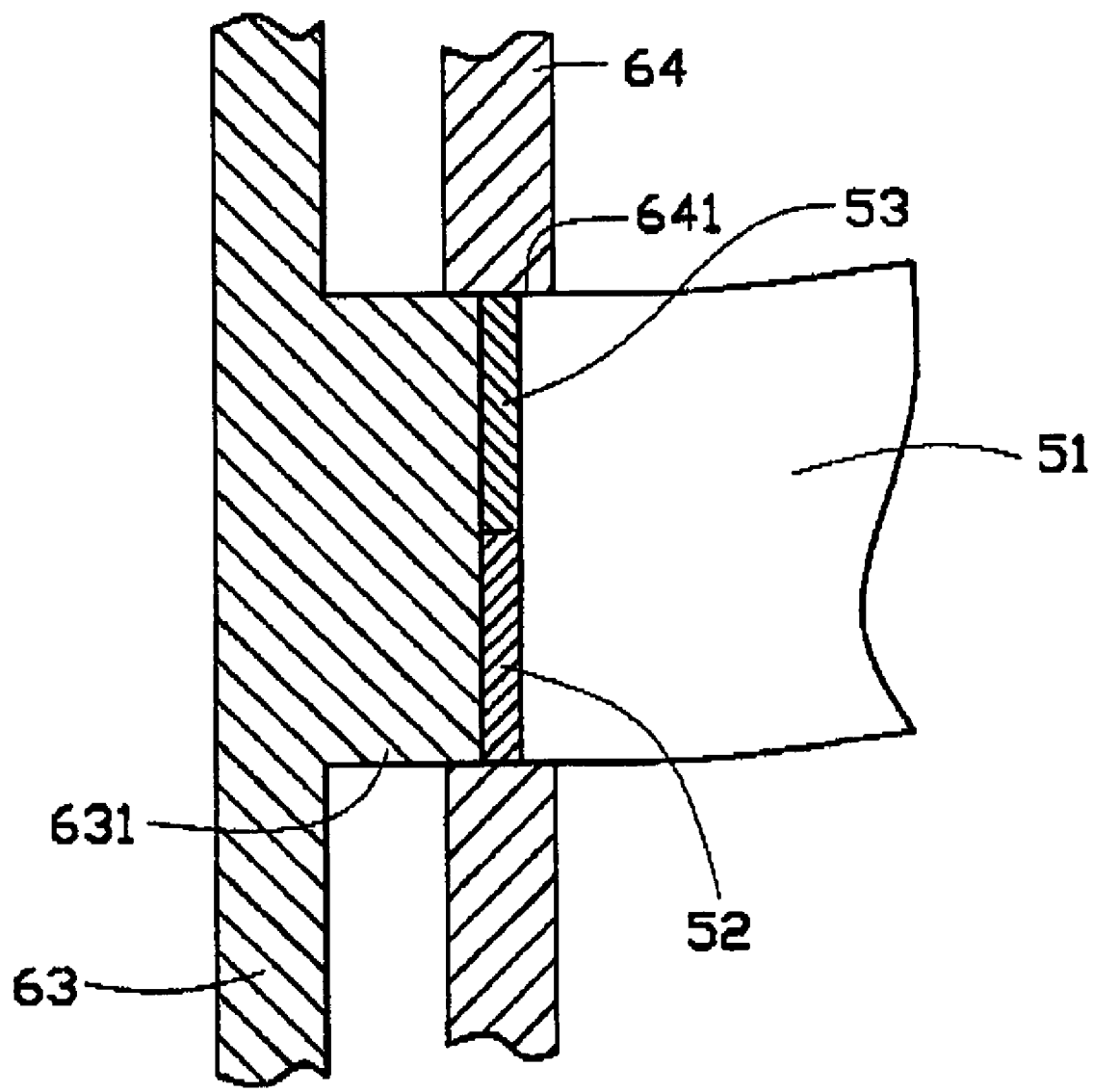
FIG. 4 is an enlarged, cross-sectional view taken along line IV-IV of FIG. 3.
Figure 5:
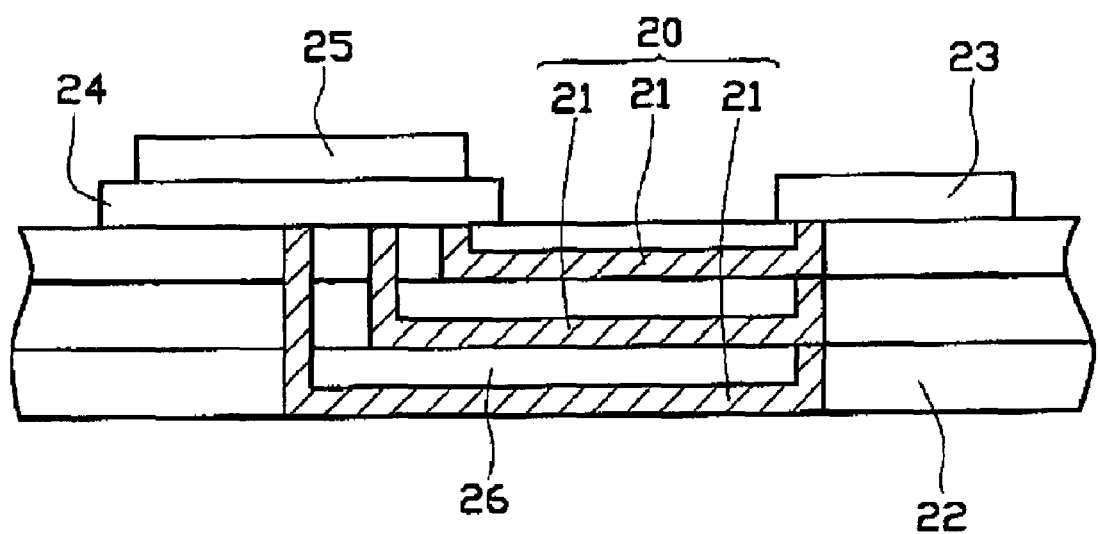
FIG. 5 is a side cross-sectional view of a conventional bus system connecting electrical components on part of a motherboard.

Referring to FIG. 2 and FIG. 3 the socket 64 defines a plurality of through holes 641. Each of the through holes 641 is configured to receive the end of a corresponding one of the optical fibers 51 that connects to the third circuit 63, together with the corresponding emitter 52 and sensor 53. The third circuit 63 includes a plurality of chip pins 631 corresponding to the through boles 641 of the socket 64. The chip pins 631 of the third circuit 63 are inserted in the through holes 641 of the socket 64 and are coupled to the emitters 52 and the sensors 53 correspondingly.

In the motherboard 60, the optical fibers 51 are used to transmit light signals. The optical fibers 51 may be single-mode optical fibers or multimode optical fibers.

The emitters 52 are configured to receive electrical signals from the circuits 61, 62, 63, convert the electrical signals to light signals, and output the light signals to the optical fibers 51. If a high level electrical signal is inputted to an emitter 52, the emitter 52 outputs a corresponding light signal. If a lower level electrical signal is inputted in the emitter 52, the emitter 52 does not output the light signal. The emitters are light emitting devices configured to convert electrical signals to optical signals. In this embodiment, the emitters 52 may be light emitting diodes (LEDs), organic light emitting diodes (OLEDs), laser diodes (LDs), or any other type of light-emitting devices for emitting the light signals.

The sensors 53 are used to detect light signals received from the optical fibers 51, convert the light signals to electrical signals, and output the electrical signals to the circuits 61, 62, 63. If a sensor 53 detects a light signal, the sensor 53 generates a high level electrical signal. If the sensor 53 does not detect a light signal, the sensor 53 does not generate any electrical signal, and therefore equates to being electrically low level. The sensors are photo sensors configured to convert optical signals to electrical signals. In this embodiment, the sensors 53 may be photodiodes or phototransistors.

Exemplary data transmission by the bus system 50 is as follows. For example, the third circuit 63 outputs electrical signals. The electrical signals are converted to light signals by the emitters 52 at the ends of the optical fibers 51 connecting to the third circuit 63. Then the light signals are transmitted to the sensors 53 at the ends of the optical fibers 51 connecting to first circuit 61 via the optical fibers 51. The sensors 53 at the ends of the optical fibers 51 connecting to the first circuit 61 convert the light signals to electrical signals, and input the electrical signals to the first circuit 61.

The bus system 50 further includes at least one light splitting member 54 disposed at intersections between the optical fibers 51. The light splitting member 54 is configured to split a single light signal into two equal light signals. When the optical fibers 51 transmit light signals from one of the circuits (for example, the third circuit 63) to the other two circuits (for example, the first circuit 61 and the second circuit 62), the light splitting member 54 splits each of the light signals from one of the optical fibers 51 into two equal light signals, and outputs the two equal light signals to two other optical fibers 51 correspondingly. In this embodiment, the light splitting member 54 is a prism lens.

A data transmission rate of the optical fibers 51 is much larger than that of metallic wires such as copper wires. Therefore, a computer employing the bus system 50 for data transmission between various electrical components such as the circuits 61, 62, 63 can have high speed in data transmission. In addition, no EMI is generated between the optical fibers 51 when light signals are transmitted in the optical fibers 51. Furthermore, essentially no heat is generated during transmission of the light signals in the optical fibers 51. Therefore, little energy is wasted in heat dissipation. Moreover, since there is no EMI between the optical fibers 51, the optical fibers 51 may be arranged on the motherboard 60 quite close to each other. Therefore, a size of the motherboard 60 employing the bus system 50 can be configured to be relatively small. Still further, the optical fibers 51 are generally made of plastic or glass having a lower density than that of copper. Therefore the motherboard 60 can be lightweight.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device comprising:
a motherboard;
a plurality of electrical components attached to the motherboard; and
a bus system interconnecting the electrical components, the bus system comprising:
a plurality of optical fibers;
a plurality of emitters;
a plurality of sensors; and
at least one prism lens, which is configured for splitting a light signal from each of at least one of the optical fibers into at least two equal light signals, and then outputting the at least two light signals to at least two other of the optical fibers;
wherein a respective one of the emitters and a respective one of the sensors are disposed at each end of each of the optical fibers, each end of each of the optical fibers with the emitter and the sensor is connected to a corresponding one of the electrical components, any one or more of the electrical components are coupled to the motherboard via a socket, the socket is integrally formed with the motherboard, the socket defines a plurality of through holes, the end of a respective one of the optical fibers with the emitter and the sensor is received in each through hole of the socket, and the corresponding electrical component comprises a plurality of chip pins received in the through holes of the socket and connected to the corresponding emitters and sensors of the ends of the optical fibers.

2. An electronic device comprising:
a motherboard;
a plurality of electrical components attached to the motherboard; and
a bus system interconnecting the electrical components, the bus system comprising:
a plurality of optical fibers;
a plurality of emitters; and
a plurality of sensors;
wherein a respective one of the emitters and a respective one of the sensors are disposed at each end of each of the optical fibers, and each end of each of the optical fibers with the emitter and the sensor is connected to a corresponding one of the electrical components, any one or more of the electrical components are coupled to the motherboard by a socket, the socket is integrally formed with the motherboard, the socket defines a plurality of through holes, the end of a respective one of the optical fibers with the emitter and the sensor is received in each through hole of the socket, and the corresponding electrical component comprises a plurality of chip pins received in the through holes of the socket and connected to the corresponding emitters and sensors of the ends of the optical fibers.

* * * * *